SELECTIVE COMMINUTION

Original Filed Sept. 6, 1968 8 Sheets-Sheet 1

INVENTORS
RICHARD N. CRANDALL
CARL H. NORDELL
BY F.W. Anderson
C.E. Tripp
ATTORNEYS

SELECTIVE COMMINUTION

Original Filed Sept. 6, 1968 8 Sheets-Sheet 2

INVENTORS
RICHARD N. CRANDALL
CARL H. NORDELL
BY F. W. Anderson
C. E. Tripp
ATTORNEYS INVENTORS
RICHARD N. CRANDALL
CARL H. NORDELL
BY F. W. Anderson
C. C. Trigg
ATTORNEYS

SELECTIVE COMMINUTION

Original Filed Sept. 6, 1968 8 Sheets-Sheet 4

INVENTORS
RICHARD N. CRANDALL
CARL H. NORDELL
BY F. W. Anderson
C. E. Tripp
ATTORNEYS

SELECTIVE COMMINUTION

Original Filed Sept. 6, 1966 8 Sheets-Sheet 5

INVENTORS
RICHARD N. CRANDALL
CARL H. NORDELL
BY F. W. Anderson
C. E. Tripp
ATTORNEYS SELECTIVE COMMINUTION
Original Filed Sept. 6, 1968 8 Sheets-Sheet 6
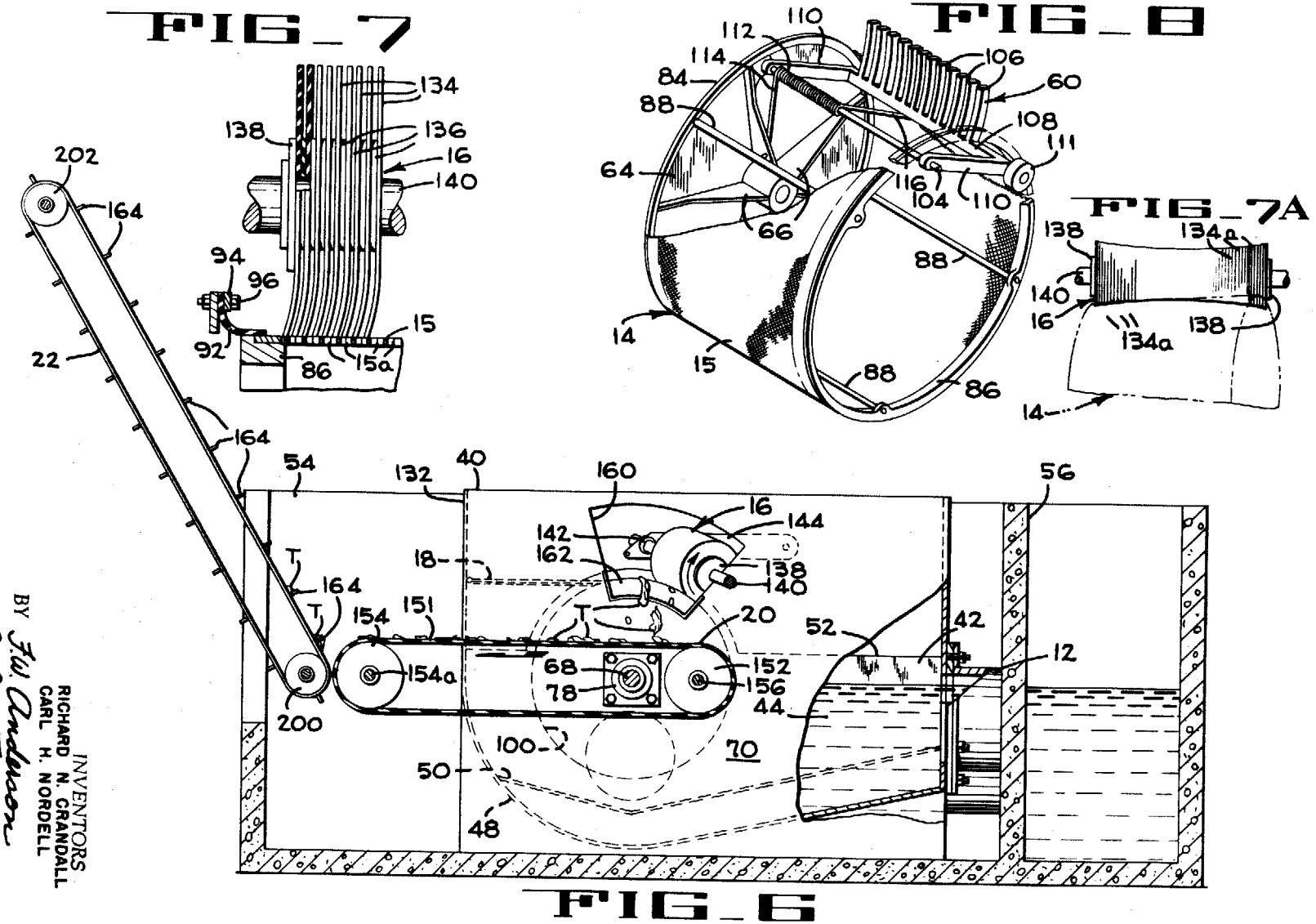
INVENTORS
RICHARD N. CRANDALL
CARL H. NORDELL
BY F.W. Anderson
C. C. Tripp
ATTORNEYS

SELECTIVE COMMINUTION

Original Filed Sept. 6, 1968 8 Sheets-Sheet 7

INVENTORS
RICHARD N. CRANDALL
CARL H. NORDELL

BY F.W. Anderson
C.E. Tripp
ATTORNEYS

INVENTORS
RICHARD N. CRANDALL
CARL H. NORDELL
BY F.W. Anderson
C.E. Tripp
ATTORNEYS

United States Patent Office

Re. 27,946
Reissued Mar. 26, 1974

27,946

SELECTIVE COMMINUTION

Richard N. Crandall, 6832 Crista Palma Drive, Huntington Beach, Calif. 92647, and Carl H. Nordell, Crystal Bay, Nev.; said Nordell assignor to said Crandall Original No. 3,570,671, dated Mar. 16, 1971, Ser. No. 757,877, Sept. 6, 1968. Application for reissue Jan. 12, 1972, Ser. No. 217,398

Int. Cl. B01d *35/28*

U.S. Cl. 210—174 16 Claims

Matter enclosed in heavy brackets [ ] appears in the original patent but forms no part of this reissue specification; matter printed in italics indicates the additions made by reissue.

ABSTRACT OF THE DISCLOSURE

A drum screen is inserted into a raw sewage line. Rake fingers help elevate solid materials picked up by the screen from the influent and are cam retracted to leave them on the periphery of the screen. A hinged presser plate holds soft, organic material against the screen to be comminuted and carried away with the effluent and into the disposal system. A scavenger roller made up of flexible discs rotates against the screen for cleaning off pieces of paper, etc., that remain on the surface of the screen, for disposal as trash.

FIELD OF INVENTION

This invention relates to liquid separation and more particularly to a selective comminution in sewage disposal systems or the like for removing paper, rags, etc., from raw sewage influent while comminuting and passing on organic material for further treatment and disposal.

SUMMARY OF THE INVENTION

The present invention is best understood in terms of the nature of raw sewage and its solids content, which will be briefly discussed.

Raw sewage solids fall into one of two categories:

Category No. 1: This category is defined as including all the sewage solids which are termed nonputrescible in the art, and that cannot be biograded. Category No. 1 solids consist mainly of solids composed of cellulose such as rags, paper and sticks, and miscellaneous tramp materials such as rubber, synthetics, plastics, bits of metal, wire, etc.

Category No. 2: This category is defined as embracing all vegetable and animal matter and wastes that will ferment and are biodegradable. In a sewage treatment system, Category No. 2 solids are subjected to some form of treatment by being held in tanks, wherein biological processes render these materials into sludge which is nonoffensive and can be dried on open beds. Category No. 2 solids can also be disposed of by discharge into open ponds known in the art as "ponding."

The solids in Category No. 1 are relatively obdurate and to comminute them requires special or powerful shearing and crushing techniques. The solids in Category No. 2 are relatively soft and friable and need no special shearing or cutting techniques for their comminution. As will be seen, it has been found in the present invention that a presser blade and a screening medium is sufficient to thoroughly disintegrate and comminute Category No. 2 solids.

The embodiment of the invention described herein is particularly useful in connection with the removal of material such as rags, papers, etc. (Category No. 1), from raw sewage in a sewage treatment system without including putrescent material (Category No. 2) therewith, and without comminuting the rags, paper, etc., in the process, so that the latter can be removed from the main sewage stream and disposed of separately a nonoffensive trash.

The illustrated embodiment is installed in a typical large scale system, and such a system will be described briefly. Raw sewage initially enters a primary settling chamber where settleable solids are removed and the liquid and suspended organic matter form a primary effluent. The primary effluent is thereafter treated by aeration and bacteriological action and undergoes a secondary settling operation which produces a nonoffensive sludge. During the bacteriological treatment, biodegradable (Category No. 2) solids such as fecal matter, etc., are transformed into gases. These nonbiodegradable (Category No. 1) solids which did not settle out in the primary settling tank are passed on to the secondary settling tank to form sludge therein.

Heretofore, it was a widespread custom to comminute all the solids in sewage flows prior to their subsequent treatment and disposal. These comminuted solids are in both of the categories, but the solids of Category No. 1 derive no benefit from the comminution and are not in need of further treatment to render them innocuous and inoffensive. They find a way into the sludge at either the primary or secondary settling tanks or both. From time to time, the settling tanks must be cleared of the sludge for disposal.

This invention contemplates a selective comminution of the sewage solids which comminutes only the solids (biodegradable) in Category No. 2 and reintroduces them into the main treatment stream. The solids in Category No. 1 are removed from the main stream in an uncomminuted condition. This is advantageous in the subsequent biological treatment of the sewage flow inasmuch as the inert solids of Category No. 1 are not passed on to the treatment tanks, but have been diverted and removed, they can be dried on beds without creating a nuisance, or they may be otherwise disposed of as by burning.

When the sewage flow is to be discharged into a body of water such as the ocean, lake or pond, under the present invention the solids in Category No. 2 will have been comminuted into a form in which they readily become widely disseminated and can be readily acted upon by the natural process of purification in those bodies of water. Category No. 1 solids include floating material such as paper, wood, etc., and would be a nuisance in the pond, etc. However, under the present invention, these inert solids will have been diverted from the main stream, and these may, if desired, be separately subjected to a very thorough fine comminution so that they will sink to the bottom instead of floating and causing a nuisance on beaches or other places where they lodge.

This is especially useful when sewage is discharged from ships in the harbor and constitutes a broad advance in this field. Furthermore, there is a method of disposing of sewage called "ponding" where the sewage is merely discharged into a pond and percolates through the bottom of the pond without any further treatment. Exclusion of the Category No. 1 solids from the pond enables the sewage pond to operate much longer because no layer of comminuted solids of Category No. 1 are present to form a more or less impervious layer on the bottom.

The apparatus of the present invention may be termed a selective comminutor which removes pieces of paper, rags, wood, etc. (Category No. 1 solids) from the raw sewage. At the same time, soft, organic materials such as fecal matter (Category No. 2 solids), which will be processed and rendered innocuous by a sewage disposal system that follows the apparatus, remain in the main disposal stream of the system.

In this manner, the total volume of sludge which accumulates in a sewage disposal system and which must be periodically removed therefrom, is reduced.

The apparatus of the present invention also dewaters absorbent material such as paper and rags and collects them as trash for convenient disposal. In the embodiment of the invention herein illustrated, the selective comminutor includes a drum screen that rotates partially immersed in the raw sewage influent. Liquid passes through the screen into an effluent chamber for further processing.

In order to pick up and process material in the influent chamber material which will not flow directly through the screen, the strainer mounts a rake assembly. Rake fingers are cyclically projected to assist in elevating out of the influent trash, bodies of fecal matter, ec., deposited on the submerged screen by the liquid head. The rake fingers are retracted and leave these materials on the exposed upper periphery of the screen. Thus materials of both categories are deposited on the screen. A hinged presser plate engages the screen as it emerges from the liquid. This plate holds back soft material (Category No. 2) as the screen passes by it. The edges of the holes in the screen abrade away and comminute the soft material, forming slugs or plugs of that material in the confines of the holes Category No. 2 material (e.g. paper and rags) is not thus comminuted, but is carried past the presser blade by the screen. A scavenger roller is disposed downstream of the presser plate and the scavenger roller rolls up trash from the periphery of the drum and discharges it to a take-away conveyor. The retracted rake clears both the presser plate and the scavenger roller as it is carrier beneath them. As a result, a dewatered trash comprising paper, rags, lint pieces of wood and other solids which would otherwise merely augment the sludge accumulation in the sewage disposal system are removed ahead of that system and in an uncomminuted form, for ready disposal as ordinary trash.

As the screen, carrying flat slugs of Category No. 2 material in its interstices, reenters the influent liquid chamber, the liquid head forces these slugs radially inwardly into the inside of the screen and into the effluent liquid therein. The effluent liquid thus carries the Category No. 2 material out of the apparatus for further treatment.

BRIEF DESCRIPTION OF THE DRAWINGS

FIG. 4A is an enlarged section through the drum end plate.

FIG. 4B is an enlarged section through the drum seal.

FIGS. 4C and 4D are enlarged views of the drum screen.

FIG. 4E is a side view of the presser plate.

FIG. 6 is a section taken on line 6—6 of FIG. 3, showing the trash discharge.

FIG. 7 is an enlarged fragmentary section of the scavenger roller.

FIG. 7A is a simplified diagram on a small scale of a modified scavenger roll.

FIG. 8 is a perspective of the drum comminutor and rake assembly.

DESCRIPTION OF THE PREFERRED EMBODIMENTS

Exemplary disposal system installation

Figure 1:
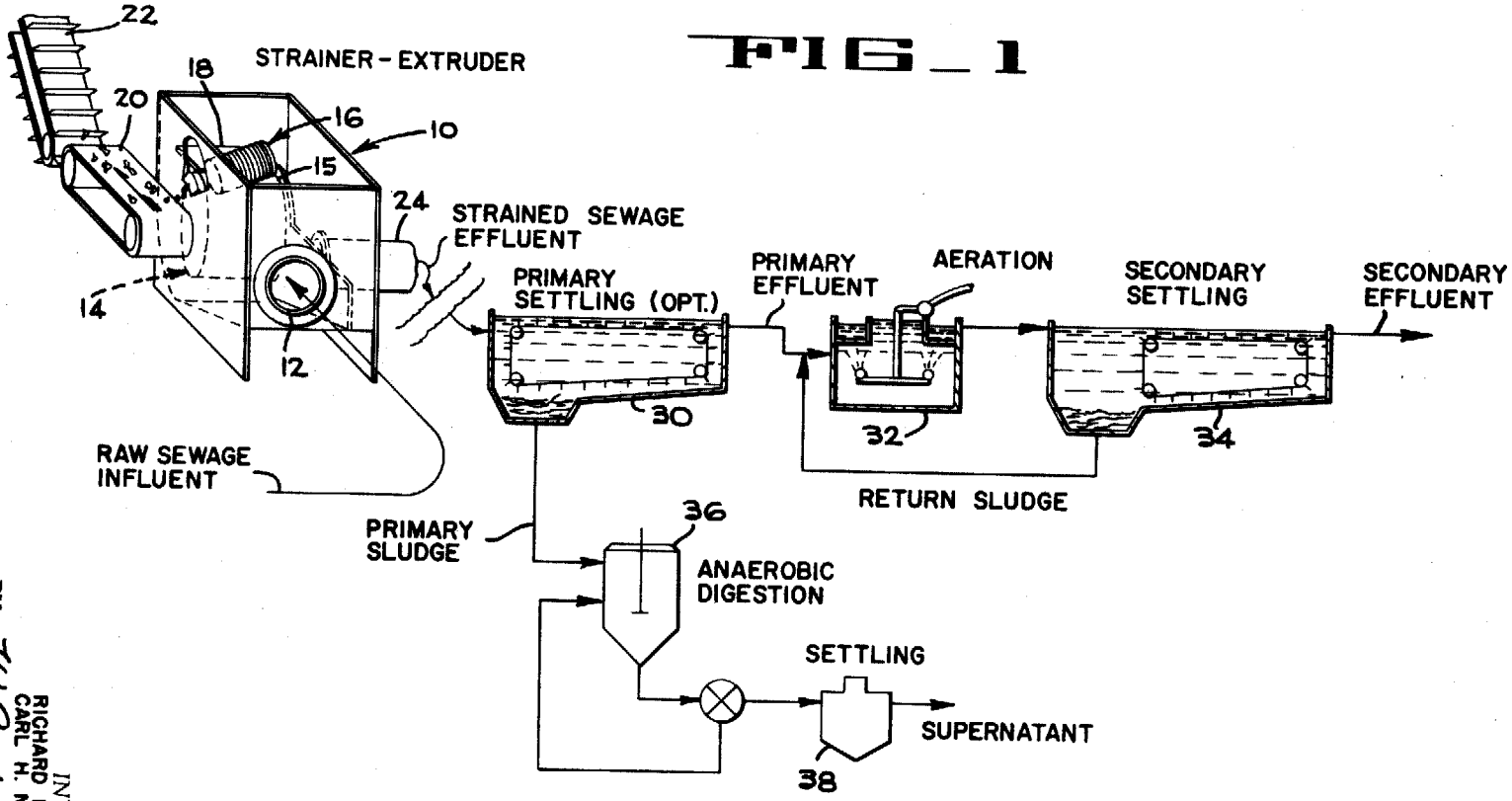
FIG. 1 shows the apparatus of the present invention in a sewage system.

The diagram of FIG. 1 shows the selective comminutor 10 of the present invention (hereinafter referred to as a comminutor for brevity, although it is more than a comminutor as that term is ordinarily used incorporated in a sewage disposal system in order to illustrate a typical application of the invention. The comminutor has an inlet 12 which receives raw sewage influent and leads to an influent chamber, to be described later. Partially submerged in the influent chamber is a rotary drum assembly 14 having a peripheral screen 15 through which liquid influent passes. A scavenger roller 16 rotates against the periphery of the screen 15 to pick the roll up and pick up paper and other trash on the periphery of the strainer.

Upstream of the roller and also above the surface of the influent is a presser 18 in the form of a gravity biased, hinged plate. The presser plate presses against the periphery of the screen and holds back soft, organic (Category No. 2) material, which eventually passes through the screen into the effluent chamber of the comminutor. The trash (Category No. 1) material remains on the screen periphery, and is picked up by the scavenger roller 16 and conveyed onto a takeaway conveyor 20 which, in turn, drops it onto an elevator 22, leading to a disposal or receptacle unit.

The effluent leaves the comminutor 10 by means of a discharge line 24. When the comminutor is installed in typical sewage disposal system such as that of FIG. 1, the discharge line 24 directs effluent to a primary settling tank 30. The effluent is thus substantially freed of cellulose material such as paper, rags, etc. (Category No. 1) which, although light in weight and often floating, is not biodegradable. The primary effluent from the primary settling tank (in the system of FIG. 1) passes through an aeration unit 32 of conventional construction and the liquid from the aeration tank passes on to a secondary settling tank 34, from which the secondary or clarified effluent is discharged.

In systems of the type shown, some of the sludge from the secondary settling tank is conducted as returned sludge back into the aeration chamber 32. Also, some of the primary sludge from the settling tank is conducted to an anaerobic digestion chamber 36, which discharged liquid to a settling chamber 38 for release of the supernatant. Material such as paper or the like, if permitted to enter the primary settling chamber 30 often passes on to the aeration and secondary settling chambers which cooperate to convert biodegradable material into gases. These (Category No. 1) materials would be not so converted, and hence would merely be recirculated through the aeration and secondary settling chambers and their effluents, thus increasing the amount of sludge that must be periodically removed therefrom. Similarly, the presence of these materials increases the need for hand raking or sludge removal in the primary settling chamber 30 when the latter is employed. As a matter of fact, the comminutor of the present invention may be of relatively more importance when employed in smaller type systems, which lacks primary settling chambers, than when employed in the more complete system shown in FIG. 1. In either case, the uncomminuted trash (Category No. 1) material fed to the conveyors 20 and 22 by the comminutor 10 of the present invention, will have been dewatered and freed of putrescible (Category No. 2) material, and this trash is of a nature which does not present serious disposal problems. In fact, most of it can be burned.

Although FIG. 1 shows the discharge line 24 of the comminutor leading to a sewage disposal system, the comminutor has other uses, and can discharge into bodies of water or ponds, as previously mentioned.

Installation of a unit

Figure 3:
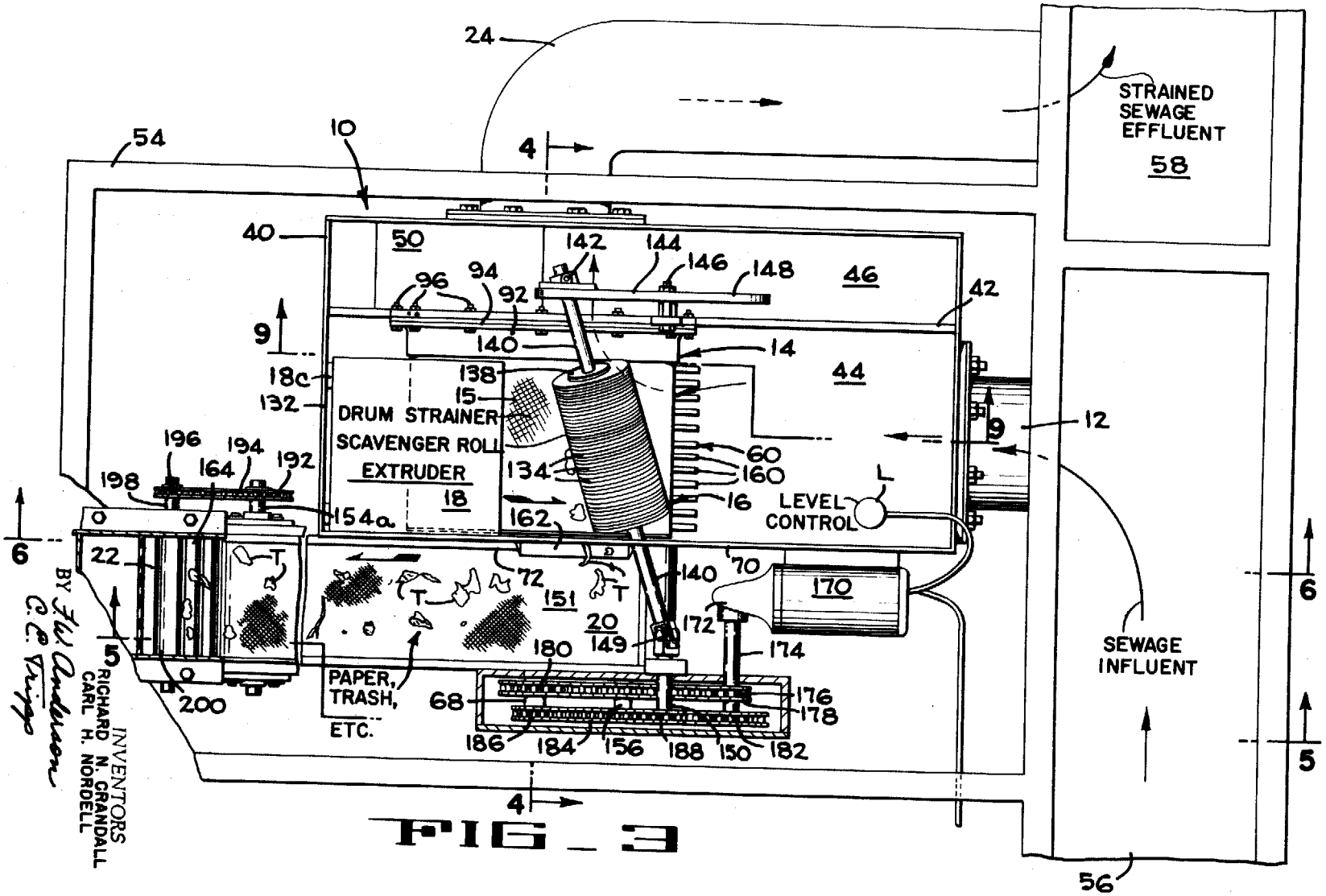
FIG. 3 is a plan view of the device and its connections.

FIGS. 3–6 show the comminutor of the present invention in an exemplary installation. The comminutor includes a boxlike housing 40 with a longitudinal partition 42 which divides the housing into an influent chamber 44 and an effluent chamber 46 (FIG. 3). The influent chamber 44 has a bottom wall 48 (FIGS. 5 and 6) which is curved to generally follow the contour of the drum screen 15. The effluent chamber 46 has a bottom wall 50 (FIGS. 4 and 5) which has its lowermost zone at the effluent outlet duct 24. The partition 42 has an upper overflow or weir edge 52 (FIG. 6) which permits overflow from the influent to the effluent chamber in case the drum screen cannot pass liquid at the flow rate through the unit.

The comminutor 10 is set in a concrete wall 54 as best seen in FIG. 3. A concrete sewage influent channel 56 leads to the influent duct 12 and a strained effluent channel 58 leads from the strained effluent duct 24. The trash elevator conveyor 22 conducts the trash out of the well for discharge to a receptacle or disposal unit (not shown) as best seen in FIG. 6.

The drum assembly

The drum assembly 14 is partially submerged and rotates in the sewage influent in the influent chamber 44. The drum assembly is so constructed that only liquid and other material which passes through the drum screen 15 can flow into the effluent chamber 46 and out of the effluent duct 24 into the strained effluent discharge channel 58. As the drum assembly 14 rotates, a rake assembly indicated generally at 60, sweeps paper and trash from the sewage influent and causes it to adhere to the periphery of the screen for eventual disposition by the scavenger roller 16, as will be described in detail presently. The rake assembly also picks up soft organic material (Category No. 2) and deposits it on the periphery of the screen.

Figure 4:
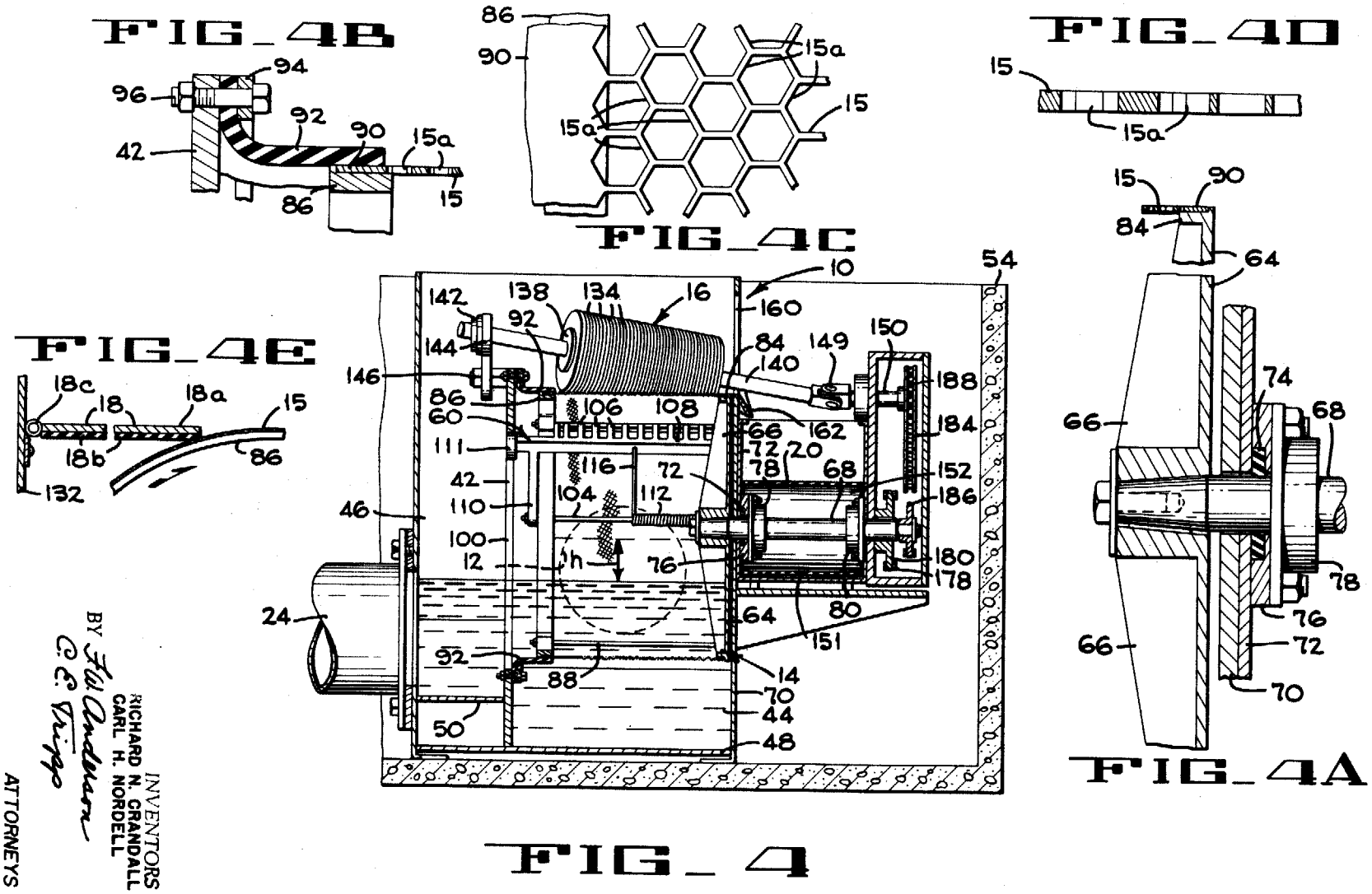
FIG. 4 is a transverse section taken on line 4—4 of FIG. 3.

The drum assembly 14 is closed at one end and open at the other, and liquid passes through the screen 15 which forms the periphery of the assembly. The liquid flows through the screen from the influent chamber 44, out the open end of the drum assembly, and into the effluent chamber 46. The drum assembly is mounted and supported for rotation by an end disc 64, which closes off that end of the drum and which has reinforcing webs 66, as best seen in FIGS. 4, 4A and 8. The end disc 64 is mounted cantilever fashion on a combined supporting and drive shaft 68 which extends through an adjacent wall 70 of the casing 40 as well as through a wall 72 of a housing for the conveyor 20.

In order to prevent flow past the end disc 64 and thus insure that all liquid in the influent chamber 44 must pass through the screen 15, a rubber sealing ring 74 (FIG. 4A) surrounds the drive shaft 68 and is retained by a retainer plate 76. Bearings 78 for this end of the shaft are mounted at the plate 76 (FIG. 4A). The drum shaft 68 is also supported on an outboard bearing 80 (FIG. 4) secured to an outer wall of the conveyor housing. The manner in which the drum shaft 68 is driven will be described in more detail presently.

The drum screen 15 is supported at the closed disc 64 on a shouldered flange 84 (FIG. 4A) and the open end of the screen is supported on a shouldered ring 86 (FIG. 4B). The screen is clamped between the shoulder on the ring 86 and a shoulder on the end plate 64 by means of tie bolts 88. The screen is imperforate at its ends to form mounting bands 90.

In the embodiment of the invention being described, the screen apertures 15a (FIGS. 4C and 4D) are formed by perforating a solid sheet of stainless steel with a punching die. In this embodiment the nominal diameter or the diameter across the flats of apertures 15a is about ¼ of an inch.

Figure 9:
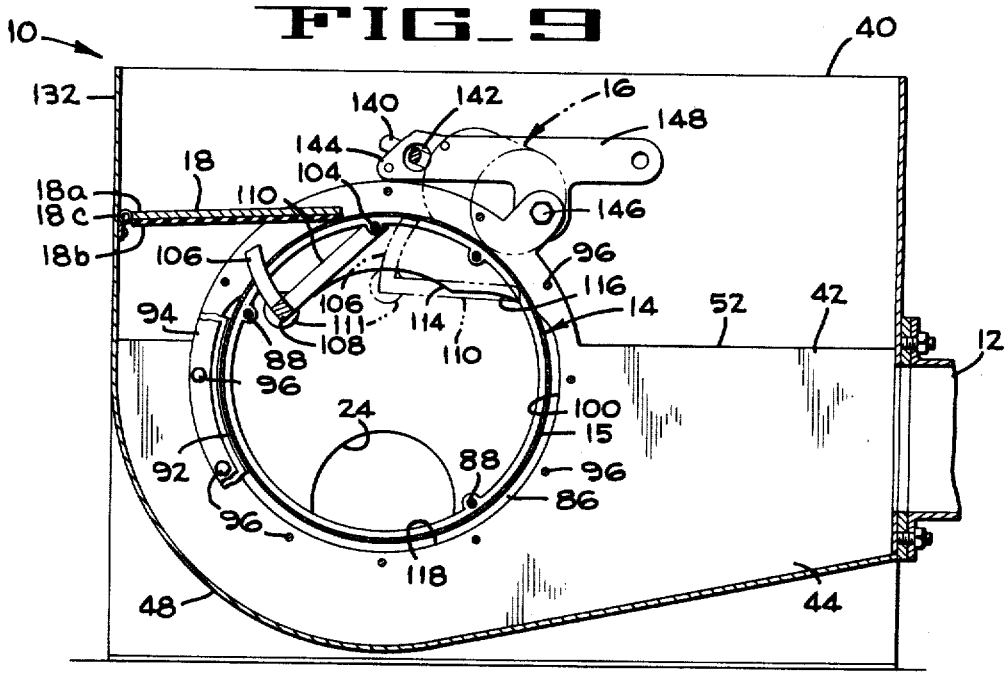
FIG. 9 is a section taken on line 9—9 of FIG. 3, showing the brake operating cam and discharge orifice.

It is essential that liquid in the effluent chamber 44 can only leave that chamber by passing through the screen 15, except by flow over the weir 52—an abnormal condition. In order to thus confine the liquid, an annular rubber sealing ring 92 bears against the periphery of the screen assembly at the open end ring 86 (FIG. 4B). The sealing ring 92 is secured to the partition 42 by a clamp ring 94 and clamp bolts 96. The sealing ring surrounds a discharge opening 100 (FIGS. 4 and 9) formed in the partition 42, for conducting liquid and organic material that passes through the screen from within the screen out into the effluent chamber 46.

In the appended claims, a drum screen assembly which causes liquid to pass through the screen before it can flow out of the interior of the screen via an end thereof, will be termed a "drum screen."

Rake assembly

When the screen is submerged, the liquid head or pressure differential across the chambers, and the flow of liquid through the screen, brings materials of both categories against the screen. The rake assembly assists in elevating these materials out of the influent as the screen leaves the latter. Also, to some extent the rake assembly 60 scoops up trash such as paper, rags, etc., from the liquid in the influent chamber 44 and deposits it—along with Category No. 2 material, on the periphery of the screen. As a result, these materials are removed from the influent for action by the presser plate 18 and the scavenger roller 16. The rake assembly is pivotally mounted on a cross-shaft 104 (FIGS. 4 and 8) extending between the end members 64 and 86 of the drum screen assembly. The rake fingers 106 are curved concentric with the cross-shaft 104 and project radially outwardly from a cross bar 108. The rake cross bar 108 is pivotally supported on the rake shaft 104 by spaced, generally tangential arms 110. The rake is normally held in its projected position by a torsion spring 112 (FIG. 8) wrapped around the rake shaft 104. One spring arm 114 is backed up by one of the webs 66 of the end disc 64. The other spring arm 116 resiliently urges the rake cross bar 108 outwardly.

The rake is retracted before the rake fingers 106 encounter the presser plate 18 and the scavenger roller 16. However, the rake should be in a projected position while it is submerged in the liquid in chamber 44, in order that trash and organic material will be lifted by the rake. When the rake fingers leave the liquid in the effluent chamber, the liquid head in the influent chamber forces materials against the screen, and gravity will also cause the trash and organic material to rest upon or adhere to the screen. The rake fingers prevent loose materials thus deposited on the screen from sliding back into the influent chamber. It is important that the rake be projected again as soon as it passes the scavenger roller 16, in order that it will again be ready to assist in gathering material from the influent chamber 44, for deposition on the screen by the liquid flow through the screen.

In order to provide this action of the rake, a cam roller 111 is mounted at the fluid discharge end of the rake cross bar 108, to be cammed inwardly by a fixed cam surface which forms the margin of the discharge opening 100 in the partition plate 42 of the housing. The cam surface includes a rake retracting section 112 (FIG. 5) which forces the rake inwardly so that it passes under the pressure plate 18 without engaging the plate. An intermediate, circular cam section 114 holds the rake in its retracted position (with the outer ends of the rake teeth 106 flush with the screen) until the rake clears the scavenger roller 16. A rake advancing cam section 116 permits the rake to be spring projected again, ready to pick up trash, etc., as described. A large radius circular cam section 118 leaves the rake advanced under force of the spring 112 while the rake is submerged.

In order to prevent string, rags, etc., from becoming wedged or caught between the rake and the screen, the screen is formed with a narrow axial segment 120 (FIG. 2) which is provided with apertures 121 that closely fit the rake fingers. Thus, as the drum screen rotates, the projected rake combs through the liquid in the influent chamber 44 (following the contour of the bottom wall 48 of that chamber) and picks up loose and floating material, trash such as paper, fecal matter, etc., for depositing it on the periphery of the drum screen.

Presser plate

The presser plate 18 is gravity urged against the periphery of the drum screen 15 in order to comminute soft, organic (Category No. 2,) material deposited on the screen by the rake. This material can then pass through the apertures in the screen to be carried away with the strained effluent. Also, the presser plate 18 presses trash such as paper, etc., against the periphery of the screen so it will be retained thereon, as well as partially dewatering such paper, rags, etc.

The presser plate includes a relatively heavy metal backing plate 18a to which is bonded a sheet of synthetic rubber 18b. The plate is hingedly mounted at 18c on the rear wall 132 (FIG. 9) of the rectangular casing 40. The weight of the presser plate assembly provides a sufficiently high unit pressure between the zone of engagement of the rubber facing 18a of the plate and the screen 15, to hold back soft organic matter for comminution by the screen, as well as to flatten and dewater paper or the like deposited on the screen by the rake assembly 60.

Scavenger roller

The scavenger roller 16 rolls up the trash paper, etc., deposited on the screen, and causes this and other trash to be conveyed axially out of the casing and onto the horizontal takeaway conveyor 20. The scavenger roller 16 is gravity pressed against the screen and is mechanically rotated in the same direction as the direction of rotation of the drum screen 14. Thus the contacting peripheral surfaces of the scavenger roller and the screen move in opposite directions.

The scavenger roller includes a stacked series of flexible discs 134 (FIG. 7) between which are clamped smaller diameter spacer discs 136 by means of end plates 138 secured on the roller shaft 140. In the embodiment of the invention shown, with a screen diameter of about 18 inches, the scavenger roller discs 134 are about 6 inches in diameter and about ⅛ inch thick. These discs are formed of a fabric reinforced rubber material such as an ethylene-propylene copolymer, and having a Shore durometer of 60 on scale A. The end plates 138 clamp the discs and their spacers together so that they rotate together and frictionally grip the scavenger roller shaft 140, to rotate with that shaft.

The scavenger roller 16 is skew mounted relative to the axis of the drum screen, the inclination of the scavenger roller and drum axes being such as to provide a wedging action in the direction of the takeaway conveyor 20, as best seen in FIG. 3. This also causes the roller to slant "downhill" in the trash delivery direction, facilitating trash movement toward the conveyor 20. In the embodiment shown, the angle between the two axes is about 20°, although this angle is not critical.

One end of the roller shaft 140 rotates in a universal joint 142 mounted on an arm 144 pivoted to the partition 42 at 146. The scavenger mounting arm 144, in the embodiment illustrated, has an extension arm 148 on which counterweights may be mounted or to which a spring may be attached to partially counter balance the weight of the scavenger roller. However, in the construction being described, no counterweight or spring was found necessary.

The other end of the scavenger roller shaft 140 is driven through a universal joint 149 and a drive shaft 150 (FIG. 3) mounted in the casing.

FIG. 7A shows a modified form of scavenger roller wherein the discs 134a are contoured to give the roller a generally hourglass shape, thus approximating the curvature of the contact zone of the scavenger roller. Experience in the field has indicated that this contouring is not essential, however, and the straight cylindrical scavenger roller 16 (due to the deflection of the discs as shown in FIG. 7) provides a good scavenging action, as well as breaking up films of water that develop across the screen.

Conveyors

The takeaway conveyor 20 is mounted to one side of the rectangular casing 40 and includes a rubberized fabric belt 151 (FIG. 6) mounted over a drive roller 152 and an idler roller 154. The drive roller 152 is driven by a shaft 156, as will be described presently. Trash rolled up and wiped along the drum screen by the scavenger roller is gradually worked toward an opening 160 (FIG. 6) formed in the sidewall 70 of the strainer casing. A discharge chute 162 (FIGS. 2–4 and 6) guides trash leaving the ends of the screen and the scavenger roller, so that it will drop onto the horizontal conveyor 20. As previously mentioned, as elevating conveyor 22 is provided at the discharge end of the horizontal takeaway conveyor 20 and this conveyor is provided with cleats 164 (FIGS. 2 and 6) for elevating the trash to a receptacle or disposal unit.

Drives

The drum screen assembly 14, the scavenger roller 16, the takeaway conveyor 20 and the elevator conveyor 22 are all driven from an electric motor 170 (FIGS. 3 and 5) driving an angle gear box 172 (FIG. 3) with an output drive shaft 174. The drum strainer 14 is driven by a sprocket 176 (FIG. 3) on the drive shaft 174, a chain 178, and a sprocket 180 on the drum shaft 68.

The scavenger roller 16 and the conveyor 20 are driven by a sprocket 182 on the angle gear driveshaft 174. A chain 184 (FIGS. 3 and 5) passes over the driving sprocket 182 and over an idler sprocket 186 freely mounted on the drum shaft 68. In order to drive the scavenger roller 16, the chain 184 is trained over a sprocket 188 (see also FIG. 4) on the scavenger roller drive shaft 150, and the chain is also trained over a sprocket 190 (FIG. 5) on the drive shaft 156 for driving the conveyor 20.

Figure 5:
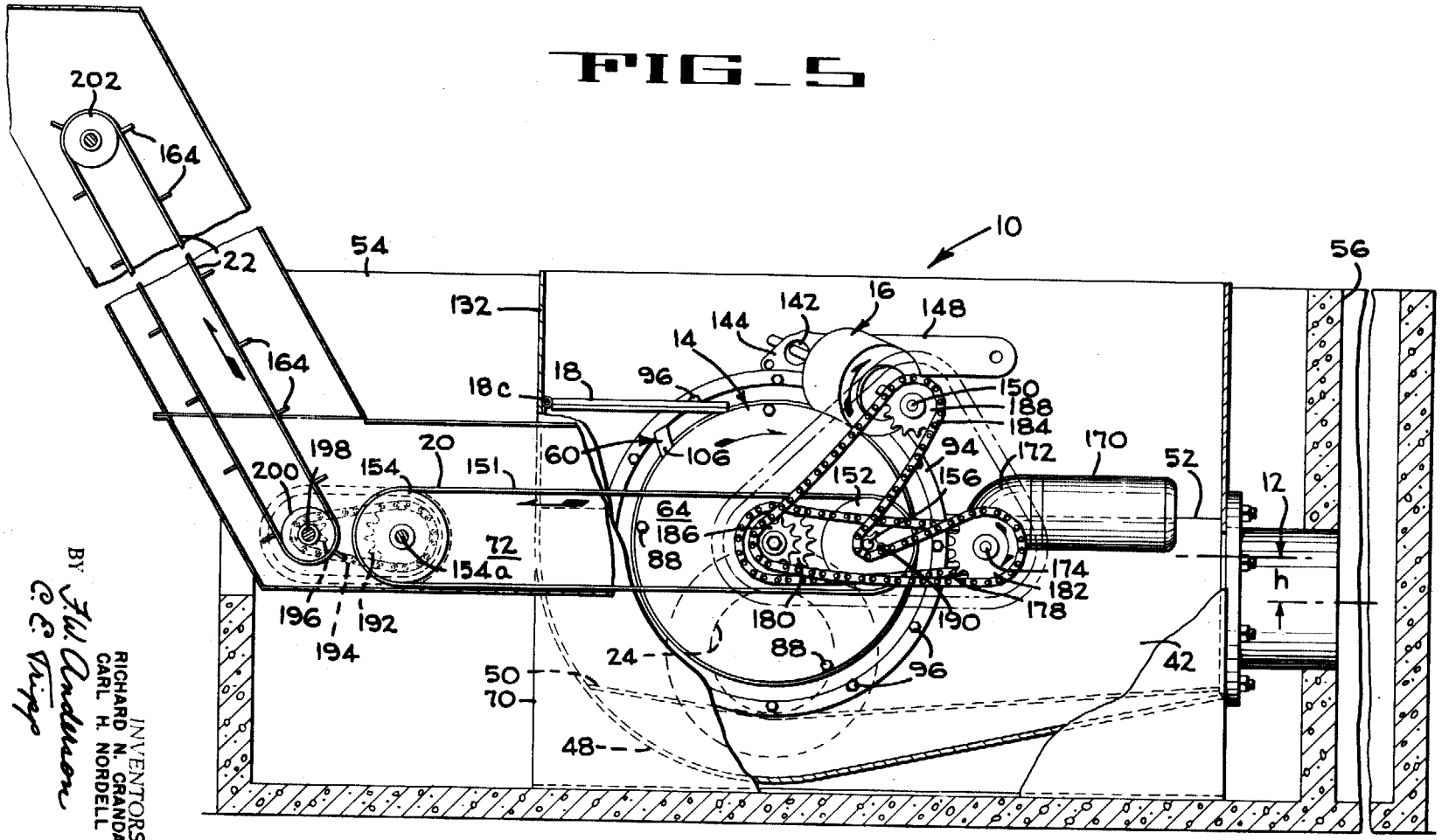
FIG. 5 is a section taken on line 5—5 of FIG. 3, showing the drive assembly.

The elevator conveyor 22 is driven from the idler shaft 154a of the idler pulley 154 for the horizontal conveyor 20 (FIG. 5). Mounted on shaft 154a is a sprocket 192 (FIGS. 3 and 5) driving a chain 194 trained around a sprocket 196 (FIG. 5) on a shaft 198 for the drive roller 200 of the elevator conveyor. The upper roller 202 of the elevator conveyor (FIG. 5) is an idler roller.

With a peripheral velocity of the drum screen at 60 feet/minute, the linear speed of the horizontal takeaway conveyor 20 is 60 feet/minute and that of the elevator 22 is 60 feet/minute, in the example shown.

General operation

The operation of the selective comminutor forming the embodiment of the invention just described will now be reviewed briefly. Raw sewage influent (FIG. 1) enters the inlet duct 12 through a sewage influent line (FIG. 3) and flows into the influent chamber 44. In normal operation, liquid and organic material can only reach the effluent chamber 46 by passing through the drum strainer screen 15, because one end of the drum screen is closed (end plate 64) and the open end thereof is sealed (rubber ring 92, FIG. 4). The drum screen assembly 14 is partially immersed in the sewage influent in the influent chamber and as it passes through that liquid, the combined actions of liquid flow through the screen and that of the rake assembly 60 deposits organic material, trash, paper, etc., against the screen 15. As this maternal is lifted out of the liquid in the influent chamber 44, with the assistance of the rake assembly, organic (Category No. 2) material adhering to the screen is retarded and pressed against the screen by the extruder plate 18, which comminutes it, as will be described in detail presently in connection with FIG. 11 and 11A. The presser plate also partially dewaters absorbent trash such as paper, rags, etc., for transport to the scavenger roller 16.

Figure 10:
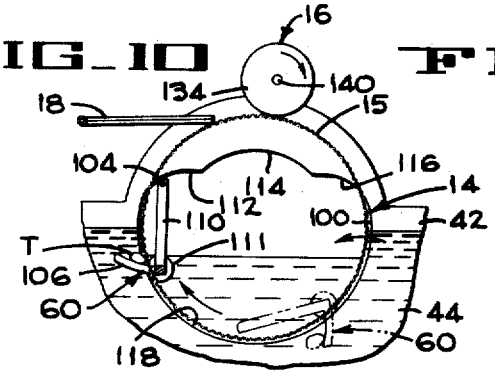
FIGS. 10 to 10C are operational diagrams of the rake assembly.
Figure 10A:
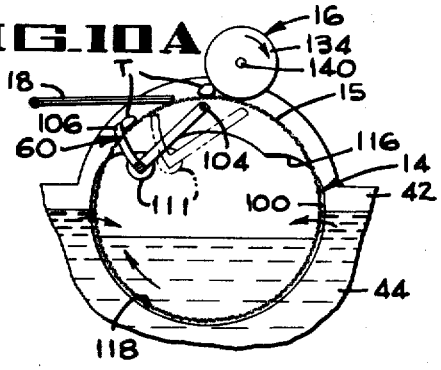

The rake fingers 106 are normally projected by the torsion spring 112 (FIG. 8) as they are carried through the liquid in the influent chamber 44, (FIG. 10). As the rake approaches the presser plate 18 the cam section 112 retracts the rake so that its fingers 106 do not strike the plate, but although retracting, the rake fingers continue to carry organic material and the trash T up to the plate. At the zone of contact of the pressure plate with the screen, the rake has been fully retracted, the trash T is flattened and dewatered, and soft organic material adhering to the periphery of the drum screen is comminuted by the screen.

Figure 2:
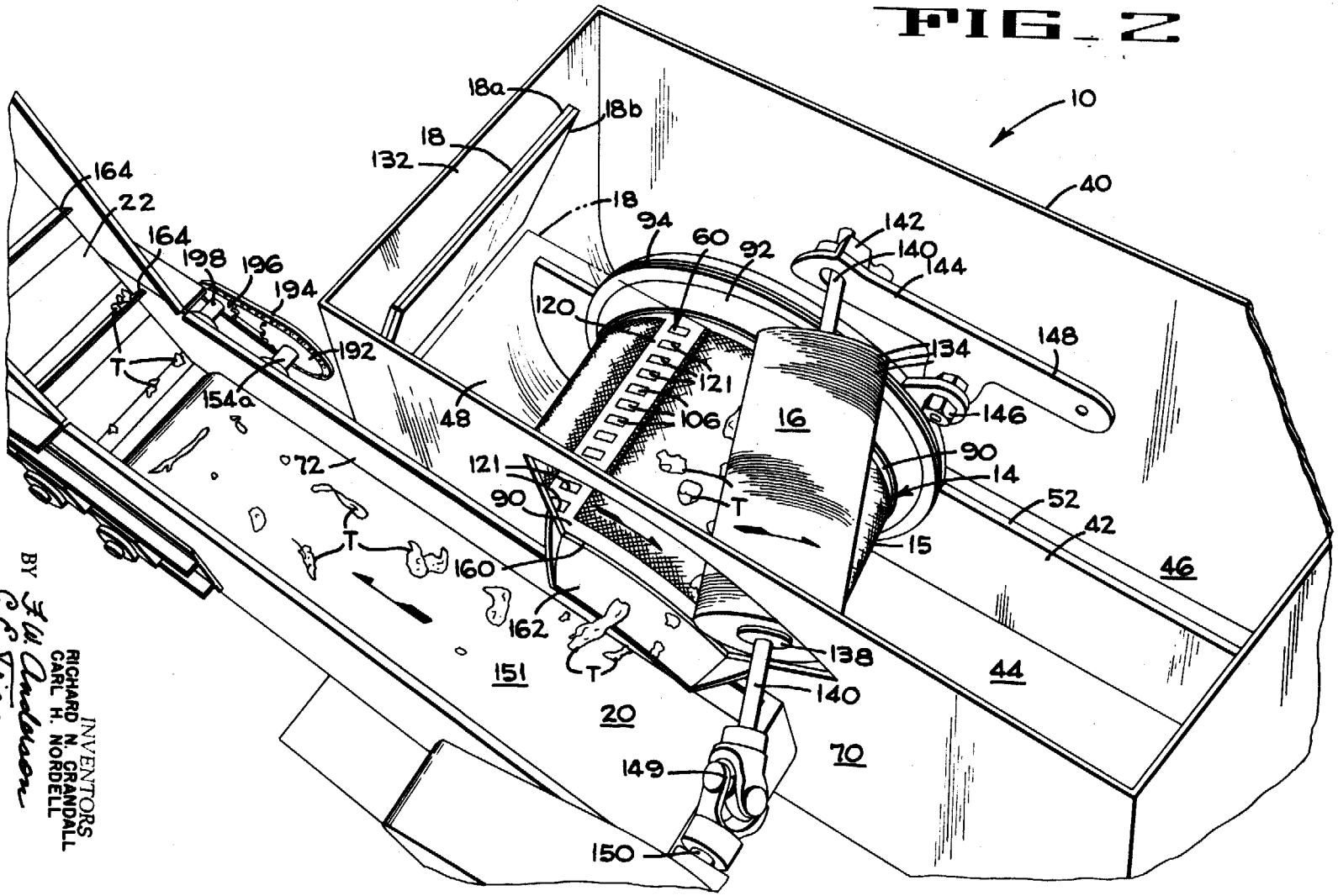
FIG. 2 is a perspective of the device.
Figure 10B:
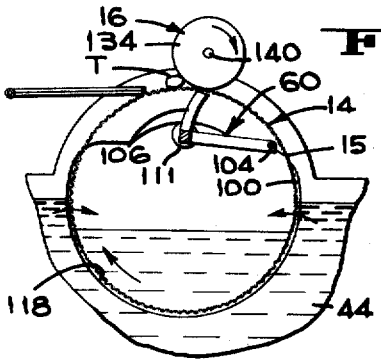
Figure 10C:
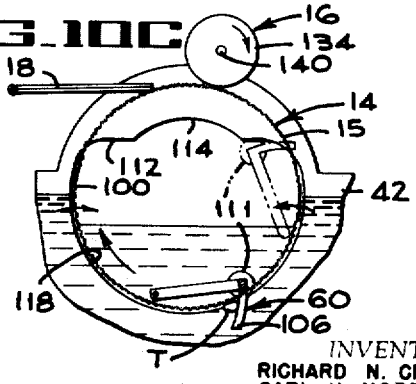

As the rake continues, it is held retracted by the small radius circular cam section 114 (FIG. 10B), so that it clears both the presser plate and the scavenger roller 16. The scavenger roller rolls up the trash T and conveys it to the takeaway conveyor 20 (FIGS. 2 and 3). The rake (FIG. 10C) is spring advanced again as it roller is carried along the cam section 116 (FIG. 10).

The drum screen 15, being partially blocked with trash and organic material, partially restricts the flow of liquid therethrough so that the head h (FIGS. 4, 5 and 11) between the liquid in the influent chamber 44 and that in the effluent chamber 46 is present during normal operation. If the screen becomes sufficiently plugged to cause the liquid level in the influent chamber 44 to rise to the height of the weir 52 (FIGS. 6–10), liquid from the influent chamber will simply spill over into the effluent chamber and flow of sewage through the unit will not be obstructed. Normally, however, as soon as the unit has been in operation for a relatively short period of time, the screen is cleared of trash by the scavenger roller and its apertures are hydraulically freed of comminuted organic material, sufficiently to prevent overflow past the weir 52.

A level control L is diagrammatically illustrated in FIG. 3 for controlling the drive motor 70. This control is not critical to the invention but can be employed if desired to turn the motor off if the level of liquid in the influent chamber is low, thus indicating that there is virtually no obstruction to liquid flowing through the drum screen. Also, the level control could be connected to increase the speed of the drive motor 70, in case the level in the influent chamber rises to that of the weir 52, thereby speeding up the screen cleaning action and removing the obstructions which cause the overflow. Controls of this type are well known in the control art and hence their details are not illustrated herein.

Selective comminuting action

Figure 11:
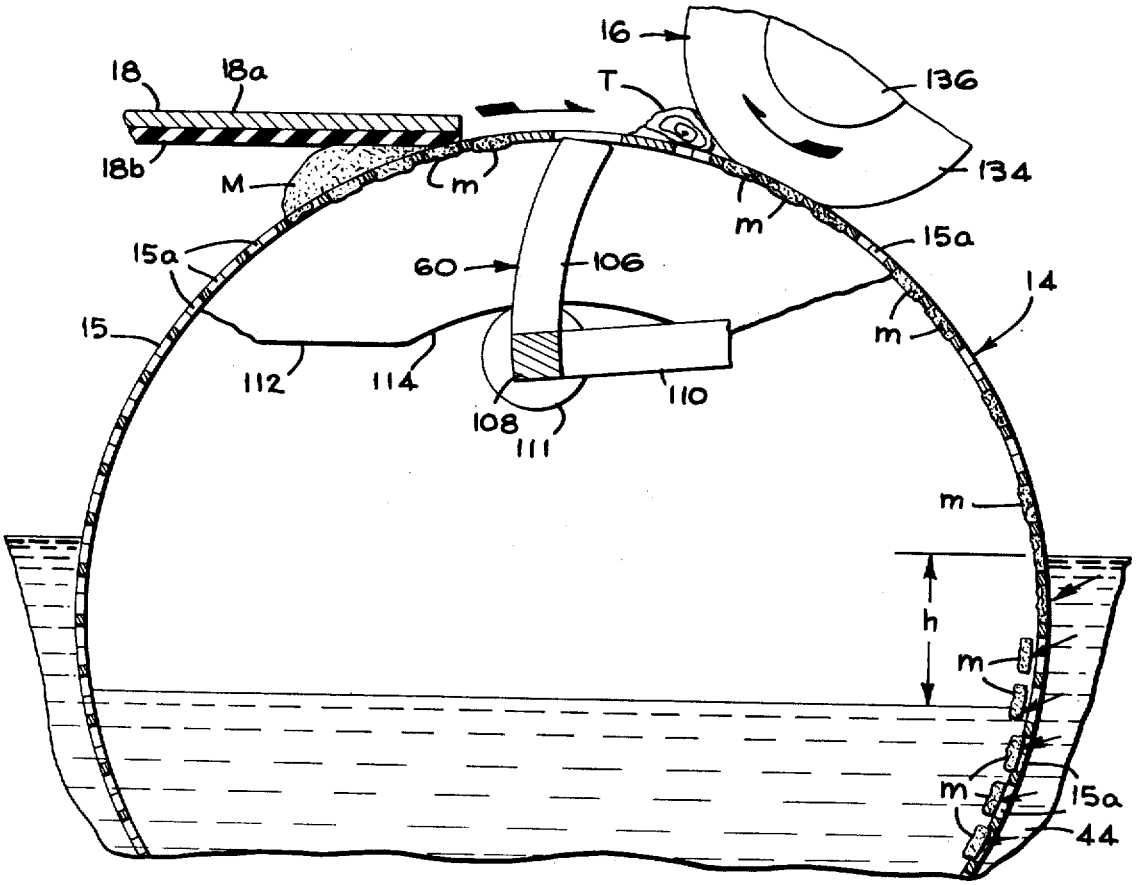
FIGS. 11 and 11A are schematic diagrams showing the comminuting action.

FIG. 11 is a simplified diagrammatic illustration of the selective comminutive action of the apparatus characteristic of the present invention. In this diagram the rake fingers 106 are retracted. Soft organic material M of Category No. 2 has been deposited on the screen, as well as trash T (Category No. 1) such as rags, papers or the like. The organic material M, originally moving with the screen or with the rake and screen combination, has been held back or retarded by the presser plate 18, but the rake fingers 106 have continued around with the rotating screen 15. Category No. 1 material, such as trash T, passes under the presser plate 18 and may lift the plate somewhat from the screen 15 without being held back by the presser plate. Hence, this material is not comminuted by the screen and presser plate combination.

Figure 11A:
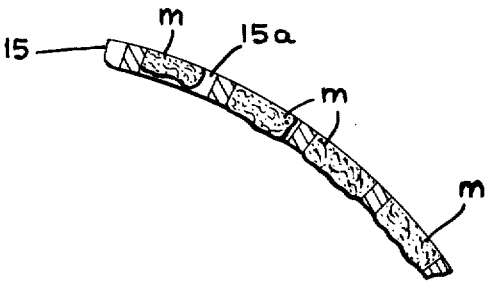

However, the organic material M is held back by the presser plate 18. This material is subjected to relative motion of the rotating screen 15. The edges of the screen apertures 15a shear, cut, scrape away, or otherwise remove from the body of the material M small slugs or plugs m of material which slugs are worked into the apertures 15a in the screen (see also FIG. 11A). These slugs of material m continue on around with the screen as illustrated in FIG. 11A, and are not particularly affected by the action of the scavenger roller 16 which merely keeps them in their original flush condition with the surface of the screen. After having passed the scavenger roller, the slugs m of Category 2 material M enter the influent liquid in the influent chamber 44 and soon thereafter enter the effluent liquid within the screen 15. As previously mentioned, a head h is normally present between the liquid levels, which forces the slugs or organic material out of the apertures in the screen 15 and into the interior of the drum. This action takes place not only in the zone where the screen initially enters the influent chamber 44, but continues as the screen is submerged on both sides. Water is constantly flowing from the influent chamber 44, through the screen, into the interior of the screen, and out of the interior of the screen, as previously described. Thus, the organic (Category No. 2) material M, as comminuted by the presser plate and drum screen combination, is transferred from the influent chamber to the effluent chamber for further treatment or for other disposition as desired. The trash T (Category No. 1) material is not so comminuted and hence remains on the periphery of the screen for removal by the scavenger roller 16.

The selective comminuting action of the apparatus of the present invention is surprisingly effective in removing putrescible (Category No. 2) material from the trash (Category No. 1) material, so that trash (as cleared by the scavenger roller and the elevators of the present invention) is not offensive and presents no disposal problems.

Of course a small amount of fecal solids, putrescible material, etc., is carried out with the trash T but, as mentioned, the amount is surprisingly small. For example, in a typical installation and with a screen 15 having ¼-inch openings, trash screenings in in the order of 16 cubic feet will be removed from the main stream by the present invention for each million gallons of water (raw sewage) passing through the unit. On a weight bases this represents about 800 pounds of trash screenings to 8,000,000 pounds of water. On a per capita daily basis, the fecal solids alone in 100 gallons of water or 833 pounds of water are about ¼ of a pound. The selective comminutor of the present invention is found to remove all but ¼ to ½ percent of the fecal matter from the trash and even assuming that the efficiency in removing fecal matter is only 99 percent so that one percent remains with the trash, this means that of the figures given above, for every pound of trash extracted from the water (which will represent a flow of about 8,300 pounds of water) only 0.003 pounds (1/10 ounce) of fecal matter will be included in that pound of trash. This is not enough to cause difficulties in disposing of the trash, and in fact the amount of putrescible material in the trash is so small, that the trash can be readily reduced to a completely inoffensive condition by a relatively mild washing technique without excessive use of water for the washing.

Thus it can be seen that the selective comminutor of the present invention relieves the accumulation of trash such as paper, rags, etc. (Category No. 2), in the settling tanks, etc. of a sewage disposal system. Nevertheless, the soft organic (Category No. 1) material, which is biodegradable in these systems, is passed on through the selective comminutor of the present invention.

The present invention has been described in a full scale sewage installation (FIG. 1). As mentioned, removal of floating (Category No. 1) material by selective comminution, coupled with passing on finely divided (Category No. 2) material, makes it worthwhile to use the apparatus of the present invention for direct discharge into large bodies of water, or for ponding, whenever these types of sewage disposal are in use.

In the appended claims, where reference is made to Category No. 1 and Category No. 2 material, the definition of these materials given in the opening statements are incorporated by reference.

Although the best mode contemplated for carrying out the present invention has been herein shown and described, it will be apparent that modification and variation may be made without departing from what is regarded to be the subject matter of the invention as set forth in the appended claims.

What we claim is:

1. Apparatus for selectively comminuting sewage or the like for subsequent processing, said apparatus comprising influent and effluent chambers, a drum screen in said influent chamber and partially immersed in the influent, said drum screen having outlet means for discharging effluent into the effluent chamber, means for rotating said drum screen, retractable raking means normally projecting outwardly from said drum screen for elevating material deposited on said screen out of the influent, presser means above the influent level for restraining soft material while the rotating screen comminutes it, scavenger means engaging the periphery of said drum screen, above the influent level and downstream of said presser means for removing uncomminuted trash from the rotating screen and means to retract the raking means before reaching the presser and the scavenger means.

2. The apparatus of claim 1, wherein said scavenger means comprises a skew mounted roller having a resilient portion engaging the periphery of said drum screen, and means for rotating said roller in the direction of screen rotation, and at a peripheral speed exceeding that of said screen.

3. The apparatus of claim 2, wherein said scavenger roller is formed of a stack of flexible discs.

4. The apparatus of claim 3, wherein said discs comprise large diameter discs engaging said screen, and smaller diameter spacer discs.

5. The apparatus of claim 2, wherein the downstream end of said scavenger roller cooperates with said drum screen to discharge the trash onto an underlying conveyor.

6. The apparatus of claim 1, wherein the apertures in said screen have a diameter of about ¼ inch.

7. The apparatus of claim 1, wherein said presser means comprises a plate, and means for yieldably holding said plate held against said screen for accommodating passage of trash.

8. The apparatus of claim 7, wherein said presser plate is tangential to the drum screen and is hinged at one end along an axis parallel to that of the screen, with its opposite end engaging and pressing against the screen.

9. The apparatus of claim 8, wherein said scavenger means comprises a skew mounted roller formed of rubberized fabric discs, and means for driving said roller in the direction of drum screen rotation.

10. The apparatus of claim 1, wherein said raking means is mounted on said drum screen.

11. The apparatus of claim 10, wherein said raking means comprises radially movable rake fingers normally projecting through apertures in said drum screen.

12. The apparatus of claim 11, wherein the bottom of said influent chamber is curved to follow the path of said rake fingers.

13. The apparatus of claim 11, wherein said raking means is retracted by a fixed cam surrounding said drum screen outlet means, and by a cam follower on the raking means.

14. The apparatus of claim 11 wherein a peripheral axial plate interrupts said drum screen, said plate being formed with apertures that closely fit said rake fingers.

*15. Apparatus for removing solid material entrained in a liquid influent such as sewage or the like, said apparatus being of the type comprising influent and effluent chambers, a drum screen partially immersed in the influent in the influent chamber, said screen having an outlet at one end for discharging strained effluent from within the screen into the effluent chamber, means for rotating said drum screen, and scavenger means for removing solid material from the upper exterior of said screen that is above the influent chamber liquid level; the improvement wherein said scavenger means comprises a roller formed of a stack of flexible discs for wiping engagement with said drum screen, said roller engaging the drum screen along an inclined, substantially straight contact zone that extends from a generally upper peripheral portion of one end of the screen to a lower peripheral portion of the other end of the screen which latter portion is downhill from said upper peripheral portion in the direction of screen rotation, and means for rotating said roller in the direction of screen rotation for causing the flexible peripheries of said discs to wedgingly urge the solid material axially along said roller and screen and off said lower peripheral end portion of the screen.*

*16. The apparatus of claim 15, wherein said flexible scavenger roller discs have spacers therebetween for accommodating disc flexure at said screen.*

References Cited

The following references, cited by the Examiner, are of record in the patented file of this patent or the original patent.

UNITED STATES PATENTS

| | | | |
|---|---|---|---|
| 1,188,340 | 6/1916 | Tark | 210—158 |
| 2,317,416 | 4/1943 | Stanley | 210—174 |
| 2,446,746 | 8/1948 | Denhard et al | 210—386 |
| 3,210,017 | 10/1965 | Nordell | 210—173 X |
| 2,995,248 | 8/1961 | Spiegel | 210—173 X |
| 2,295,633 | 9/1942 | Chase | 210—174 |
| 2,378,757 | 6/1945 | Durdin | 210—173 X |

CHARLES N. HART, Primary Examiner

UNITED STATES PATENT OFFICE

CERTIFICATE OF CORRECTION

PATENT NO. : Re. 27,946

DATED : March 26, 1974

INVENTOR(S) : RICHARD N. CRANDALL et al

It is certified that error appears in the above-identified patent and that said Letters Patent are hereby corrected as shown below:

Column 2, line 2, "a" should be --as--.

Column 3, line 12, "ec" should be --etc--.

Column 4, line 2, after "used" insert --)--.

Column 5, line 43, "wail" should be --wall--.

Column 6, line 32, "112" should be --112a--.

Column 6, line 33, "114" should be --114a--.

Column 6, line 34, "116" should be --116a--.

Column 6, line 57, "(Fig. 5)" should be --(Fig. 10)--.

Column 8, line 19, delete "re-"

Column 9, line 18, "it" should be --its--.

Column 9, line 67 "This" should be --Thus--.

Column 10, line 34 "bases" should be --basis--.

Column 10, line 55 "2" should be --1--.

Column 10, line 57, "1" should be --2--.

Signed and Sealed this

*twenty-third* Day of *March 1976*

[SEAL]

*Attest:*

RUTH C. MASON
*Attesting Officer*

C. MARSHALL DANN
*Commissioner of Patents and Trademarks*